US011039319B2

(12) United States Patent
Shelton et al.

(10) Patent No.: US 11,039,319 B2
(45) Date of Patent: Jun. 15, 2021

(54) ACCESS CONTROL LEVELS BETWEEN DEVICES

(71) Applicant: HEWLETT-PACKARD DEVELOPMENT COMPANY, L.P., Spring, TX (US)

(72) Inventors: Gerold Keith Shelton, Boise, ID (US); Jeremy Ray Jensen, Boise, ID (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/349,140

(22) PCT Filed: Mar. 6, 2017

(86) PCT No.: PCT/US2017/020883
§ 371 (c)(1),
(2) Date: May 10, 2019

(87) PCT Pub. No.: WO2018/164659
PCT Pub. Date: Sep. 13, 2018

(65) Prior Publication Data
US 2020/0196136 A1   Jun. 18, 2020

(51) Int. Cl.
H04B 10/114   (2013.01)
H04W 12/00   (2021.01)
H04W 12/50   (2021.01)
G06F 21/44   (2013.01)
H04W 8/00   (2009.01)
H04W 12/47   (2021.01)
H04W 12/084   (2021.01)
H04W 92/18   (2009.01)

(52) U.S. Cl.
CPC .......... H04W 12/50 (2021.01); G06F 21/445 (2013.01); H04B 10/1143 (2013.01); H04W 8/005 (2013.01); H04W 12/084 (2021.01); H04W 12/47 (2021.01); H04W 92/18 (2013.01)

(58) Field of Classification Search
CPC ................. H04B 10/114–116; H04W 12/003
See application file for complete search history.

(56) References Cited

U.S. PATENT DOCUMENTS 5,315,645 A * 5/1994 Matheny ............ H04B 10/1143
                                            379/144.01
8,634,776 B2   1/2014 Wang
8,656,067 B2 * 2/2014 Hanes .................... G06F 3/0231
                                            710/15

(Continued)

FOREIGN PATENT DOCUMENTS

CN        104796535 A      7/2015
WO    WO-2012122268 A2    9/2012

Primary Examiner — Nathan M Cors
(74) Attorney, Agent, or Firm — HPI Patent Department

(57) ABSTRACT

In an example implementation according to aspects of the present disclosure, a method may include receiving, at an optical receiver of a first device, a transmission signal from an optical transmitter source of a second device. The method may include decoding the transmission signal to generate a pairing code, and using the pairing code to pair the first and second devices together for wireless communication. The method may include granting a level of access control of the first device to the second device via the wireless communication, wherein the level of access control is based on the pairing code.

14 Claims, 3 Drawing Sheets

(56) References Cited

U.S. PATENT DOCUMENTS

| | | | |
|---|---|---|---|
| 2002/0003640 A1* | 1/2002 | Trezza | H04B 10/2725 |
| | | | 398/161 |
| 2003/0070070 A1* | 4/2003 | Yeager | G06F 9/544 |
| | | | 713/157 |
| 2009/0208221 A1* | 8/2009 | Sasai | H04B 10/116 |
| | | | 398/130 |
| 2009/0319673 A1 | 12/2009 | Peters | |
| 2010/0064365 A1* | 3/2010 | Kanduri | G06F 21/31 |
| | | | 726/21 |
| 2010/0302973 A1* | 12/2010 | Lange | H04L 12/4641 |
| | | | 370/254 |
| 2011/0258689 A1 | 10/2011 | Cohen et al. | |
| 2011/0306882 A1 | 12/2011 | Hannon et al. | |
| 2014/0208387 A1* | 7/2014 | Ganesh | H04W 12/04 |
| | | | 726/4 |
| 2014/0325220 A1* | 10/2014 | Tunnell | G06F 21/00 |
| | | | 713/168 |
| 2015/0098706 A1 | 4/2015 | Narendra et al. | |
| 2016/0050700 A1 | 2/2016 | Gu et al. | |
| 2016/0294872 A1* | 10/2016 | Walline | H04L 63/20 |
| 2018/0124063 A1* | 5/2018 | Vissa | H04L 63/105 |
| 2018/0206122 A1* | 7/2018 | Bradley | H04W 4/00 |
| 2019/0174304 A1* | 6/2019 | Tunnell | H04W 12/003 |

* cited by examiner

ACCESS CONTROL LEVELS BETWEEN DEVICES

BACKGROUND

Before two devices communicate with each other via a wireless communication scheme, such as Bluetooth communication technology, the devices may be synchronized and paired with each other so that data transmission and sharing or corresponding operation can be executed. Pairing data for Bluetooth communication between two devices may be configured in advance, for example, during manufacturing. The host of the devices may be arranged to store pairing data for the slave in advance. For example, the host may store a PIN code or address. However, when there is a group of host and slave devices, and a user may desire to pair a particular host and slave device together, the user may manually enter the Bluetooth pairing data so as to make the host and slave device successfully pair with each other.

DETAILED DESCRIPTION

Examples disclosed herein provide the ability for two devices to be paired together for wireless communication, wherein the pairing occurs via light pulses emitted from one of the devices and captured by the other device. The device that receives the light pulses may decode it to generate a pairing code that is used for pairing, the two devices together. As will be further described, the level of access control that is granted for the devices to communicate with each other may be based on the pairing code.

Figure 1:
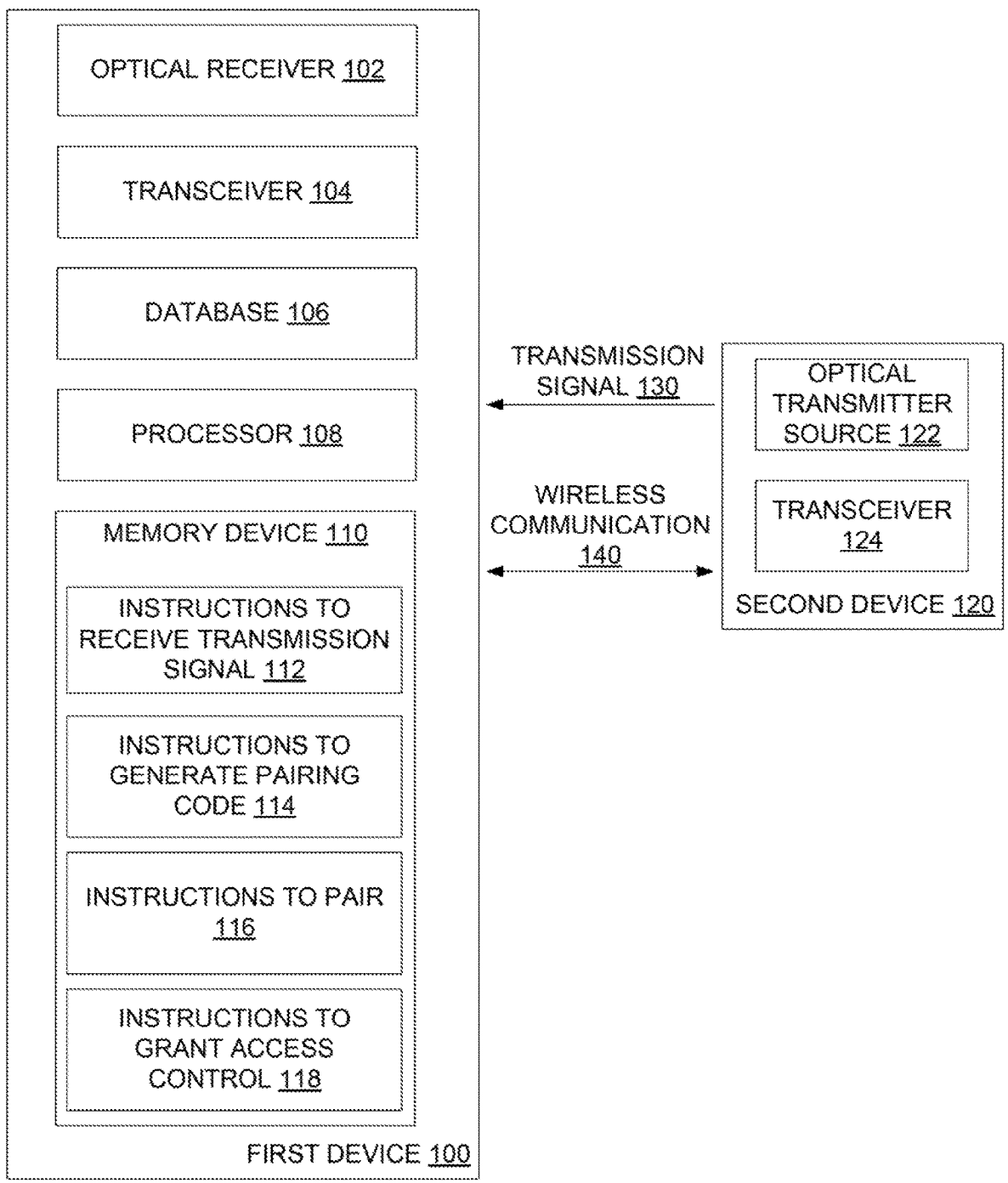
FIG. 1 illustrates a first device and a second device that may be paired together for wireless communication, according to an example.

With reference to the figures, FIG. 1 illustrates a first device 100 and a second device 120 that may be paired together for wireless communication, according to an example. As will be further described, pairing may be initiated by a user that triggers a transmission signal 130 to be emitted from an optical transmitter source 122 of the second device 120, which is then received at an optical receiver 102 of the first device 100. As an example, the transmission signal 130 may correspond to a series of light pulses emitted from the optical transmitter source 122. A pairing code decoded from the transmission signal 130 may be used for pairing the first and second devices 100, 120 together, via their respective transceivers 104, 124. In addition, the level of access control of the first device 100 granted to the second device 120 may be based on the decoded pairing code. As an example, users of the second device 120 may be granted different privileges (e.g., standard privileges vs, administrator privileges), and, as a result, the transmission signal 130 emitted from the optical transmitter source 122 may vary, based according to the privileges granted to the user logged into the second device 120.

The first device 100 depicts a processor 108 and a memory device 110 and, as an example of the first device 100 performing its operations, the memory device 110 may include instructions 112-118 that are executable by the processor 108. Thus, memory device 110 can be said to store program instructions that, when executed by processor 108, implement the components of the first device 100. The executable program instructions stored in the memory device 110 include, as an example, instructions to receive a transmission signal (112), instructions to generate a pairing code (114), instructions to pair (116), and instructions to grant access control (118).

Instructions to receive a transmission signal (112) represent program instructions that when executed by the processor 108 cause the first device 100 to receive, at the optical receiver 102, a transmission signal 130 from the optical transmitter source 122 of the second device 120. As mentioned above, the emission of the transmission signal 130 from the optical transmitter source 122 may be triggered or initiated by a user of the second device 120. As an example, the user may prepare the first device 100 to receive a transmission signal, align the optical receiver 102 of the first device 100 with the optical transmitter source 122 of the second device 120, in order to ensure that the transmission signal is received, and then initiate the transmission signal from the second device 120.

As an example, the optical receiver 102 of the first device may be a camera or light sensor that is able to collect the transmission signal 130, which corresponds to pulse light information. Referring to the optical transmitter source 122 emitting the transmission signal 130, it may have the ability to flash a sequence of lights. Examples of the optical transmitter source 122 include a display screen of the second device 120, or a LED or bulb, such as a camera flash of the second device 120. As an example of preparing the first device 100 to receive the transmission signal 130, the first device 100 may be placed in a standby mode or receive mode, in order to enable to optical receiver 102 to receive the transmission signal 130. Similarly, the transmission signal 130 may be emitted from the optical transmitter source 122 via a physical interaction, such as a pushbutton, as an example.

As an example, the transmission signal 130 may be generated by the optical transmitter source 122 based on at e one of brightness, variations, color variations, and pattern variations of light signals generated, for example, from the display screen or camera flash of the second device 120, as mentioned above. As an example, firmware of the second device 120 may encrypt a data set into a light sequence that represents the transmission signal 130, that is then later decoded by the first device 100 upon receipt of the transmission signal 130, for pairing the first and second devices 100, 120 together, as will be further described. The data set that is encrypted in the transmission signal 130 may be representative of the pairing code required for pairing the first and second devices 100, 120 together. As mentioned above, as users attempting to access the first device 100 via the second device 120 may have different privileges, the pairing code may vary according to the privileges granted to each user. As an example, the privileges granted to each user corresponds to the level of access control the user has to the first device 100 via the second device 120. The transmission signal 130, representative of the pairing code required for the user of the second device 120 to access the first device 100, may be unique for each user, or unique for a classification of users (e.g., guest users, standard users, and administrators).

Instructions to generate a pairing code (114) represent program instructions that when executed by the processor 108 cause the first device 100 to decode the transmission signal 130 received by the optical receiver 102, in order to generate a pairing code for pairing the first and second devices 100, 120 together. As described above, upon placing the first device 100 in a standby or receive mode, in order to prepare the optical receiver 102 for receiving a transmission signal from another device (e.g., the second device 120), the optical receiver 102 of the first device 100 may monitor for an initial connection protocol from the other device, such as a fixed set of light pulses. This may allow for time to align the first and second devices 100, 120 with respect to each other, so that the optical receiver 102 of the first device 100 is able to collect pulses originating from the optical transmitter source 122 of the second device 120. Upon collecting the initial connection protocol, the optical receiver 102 may collect the transmission signal 130 from the optical transmitter source 122. As an example, optical transmitter source 122 may correspond to a camera flash of the second devices, and the optical receiver 102 may collect authenticated pulses from the camera flash. Software and firmware within the first device 100 may authenticate the transmission signal 130 and decode it to generate the pairing code that may be used for pairing the first and second devices 100, 120 together.

Instructions to pair (116) represent program instructions that when executed by the processor 108 cause the transceiver 104 of the first device 100 to use the pairing code decoded above to pair together with the transceiver 124 of the second device 120, for wireless communication 140. As an example, the pairing code may be used to pair the first and second devices 100, 120 together for Bluetooth wireless communication. However, other forms of wireless communication may be used for pairing the first and second devices 100, 120 together (e.g., connecting via an SSID broadcasted by one of the devices to join a common wireless network). In an effort to increase security, the pairing code used to pair the first and second devices 100, 120 together may be different for subsequent pairing attempts. As a result, the transmission signal 130 from the optical transmitter source 122 may be different each time the user of the second device 120 attempts to pair with the first device 100. Each different transmission signal may then be decoded to generate different pairing codes for each subsequent pairing.

Instructions to grant access control (118) represent program instructions that when executed by the processor 108 cause the first device 100 to grant a level of access control of the first device 100 to the second device 120 via the wireless communication. As described above, users attempting to access the first device 100 via the second device 120 may have different levels of privileges for accessing the first device 100. As a result, the transmission code 130 used for pairing may be unique to the user or to a classification of users that the user belongs to. This pairing code, upon establishing wireless communication with the first and second devices 100, 120, may then be used for granting the level of access control appropriate to the user of the second device 120. As an example, each attempt of a device, such as the second device 120, pairing with the first device 100 may be logged in a database 106 associated with the first device 100, for tracking purposes. Each log entry may include the level of access control granted for that particular pairing attempt with the first device 100.

Memory device 110 represents generally any number of memory components capable of storing instructions that can be executed by processor 108. Memory device 110 is non-transitory in the sense that it does not encompass a transitory signal but instead is made up of at least one memory component configured to store the relevant instructions. As a result, the memory device 110 may be a non-transitory computer-readable storage medium. Memory device 110 may be implemented in a single device or distributed across devices. Likewise, processor 108 represents any number of processors capable of executing instructions stored by memory device 110. Processor 108 may be integrated in a single device or distributed across devices. Further, memory device 110 may be fully or partially integrated in the same device as processor 108, or it may be separate but accessible to that device and processor 108.

In one example, the program instructions 112-118 can be part of an installation package that when installed can be executed by processor 108 to implement the components of the first device 100. In this case, memory device 110 may be a portable medium such as a CD, DVD, or flash drive or a memory maintained by a server from which the installation package can be downloaded and installed. In another example, the program instructions may be part of an application or applications already installed. Here, memory device 110 can include integrated memory such as a hard drive, solid state drive, or the like.

Figure 2:
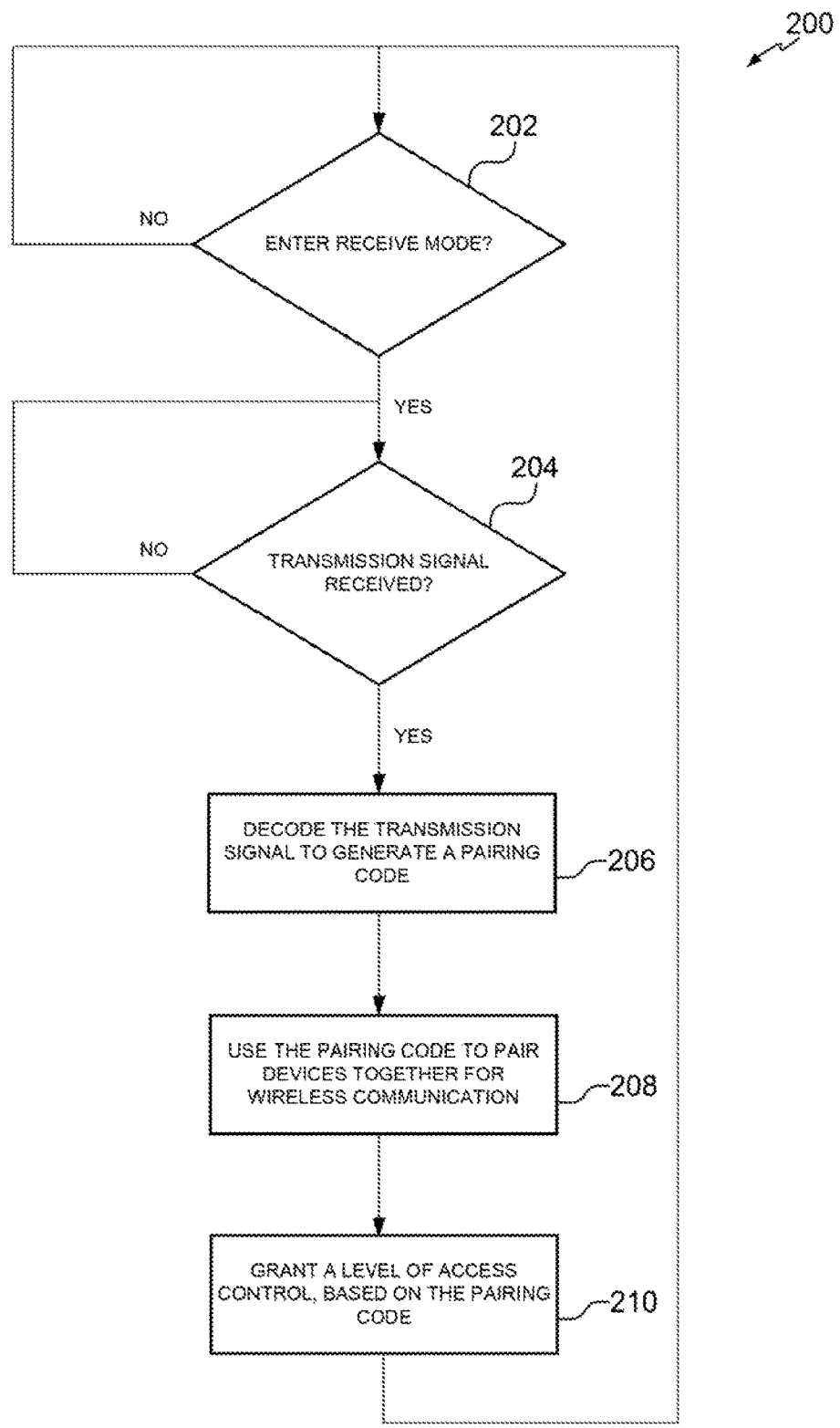
FIG. 2 illustrates a method at a device for pairing with another device for wireless communication, according to an example.

FIG. 2 illustrates a method 200 at a device for pairing with another device for wireless communication, according to an example. In discussing FIG. 2, reference may be made to the first device 100 illustrated in FIG. 1. Such reference is made to provide contextual examples and not to limit the manner in which method 200 depicted by FIG. 2 may be implemented.

Method 200 begins at 202, where the device determines whether to enter receive mode, in order to prepare to receive a transmission signal from another device (e.g., second device 120) that is attempting to pair with the device (e.g., first device 100). As described above, in order to prepare the first device 100 to receive a transmission signal 130 from the second device 120, the first device 100 may be placed in a receive or standby mode by enabling the optical receiver 102 of the first device 100 to receive transmission signals. As an example, the optical receiver 102 may be a camera or light sensor that is able to collect the transmission signal 130, which corresponds to pulse light information.

At 204, the device determines whether a transmission signal is received. Until the device determines that the transmission signal has been received, the device may remain in receive mode for an indefinite period of time or a fixed period of time. Referring to FIG. 1, upon placing the first device 100 in a standby or receive mode, in order to prepare the optical receiver 102 for receiving a transmission signal from the second device 120, the optical receiver 102 of the first device 100 may monitor for an initial connection protocol from the second device 120, such as a fixed set of light pulses. This may allow for time to align the first and second devices 100, 120 with respect to each other, so that the optical receiver 102 of the first device 100 is able to collect pulses originating from the optical transmitter source 122 of the second device 120. Upon collecting the initial connection protocol, the optical receiver 102 may collect the transmission signal 130 from the optical transmitter source 122.

At 206, upon receiving the transmission signal, the device decodes the transmission signal to generate a pairing code. As an example, software and firmware within the device may authenticate the transmission signal and decode it to generate the pairing code that may be used for pairing the devices together. At 208, the device may use the pairing code to pair the devices together for wireless communication (e.g., Bluetooth). As an example, transceivers of both devices may be used for establishing the wireless communication. Although Bluetooth wireless communication is described, other forms of wireless communication may be used for pairing the devices together (e.g., connecting via an SSID broadcasted by one of the devices to join a common wireless network).

At 210, the device may grant a level of access control to the other device, based on the pairing code. As described above, users attempting to access a first device via a second device may have different levels of privileges for accessing the first device. As a result, the transmission code used for pairing may be unique to the user or to a classification of users that the user belongs to. This pairing code, upon establishing wireless communication with the first and second devices, may then be used for granting the level of access control appropriate to the user of the second device.

As an example of the above-described method, a service personnel of a large commercial press may have to connect to the press securely, in order to access a service module of the press and retrieve data. As an example of connecting a device belonging to the service personnel to the press, Bluetooth pairing may be used. The service personnel may put the press into standby mode (e.g., for receiving Bluetooth service pairing), and place a camera flash of their device near a pulse sensor associated with the press. The pulse sensor monitors for an initial connection protocol (e.g., a fixed set of pulses), and begins collecting authenticated pulses from the camera flash (e.g., transmission signal 130). At the end of the sequence, the device belonging to the service personnel may be Bluetooth paired with the press (e.g., wireless communication 140), and service software may connect securely to service firmware of the commercial press. As an example of the level of access control the service personnel may have to the press, the authenticated pulses, or the transmission signal, from the camera flash for establishing the connection between the device and the press may be used for determining the level. As a result, a service personnel with greater privileges (e.g., administrator) may be granted a greater level of access control, based on the authenticated pulses used by that service personnel when attempting to connect to the press. Similarly, a service personnel with reduced privileges (e.g., guest or standard user) may be granted a lower level of access control.

Figure 3:
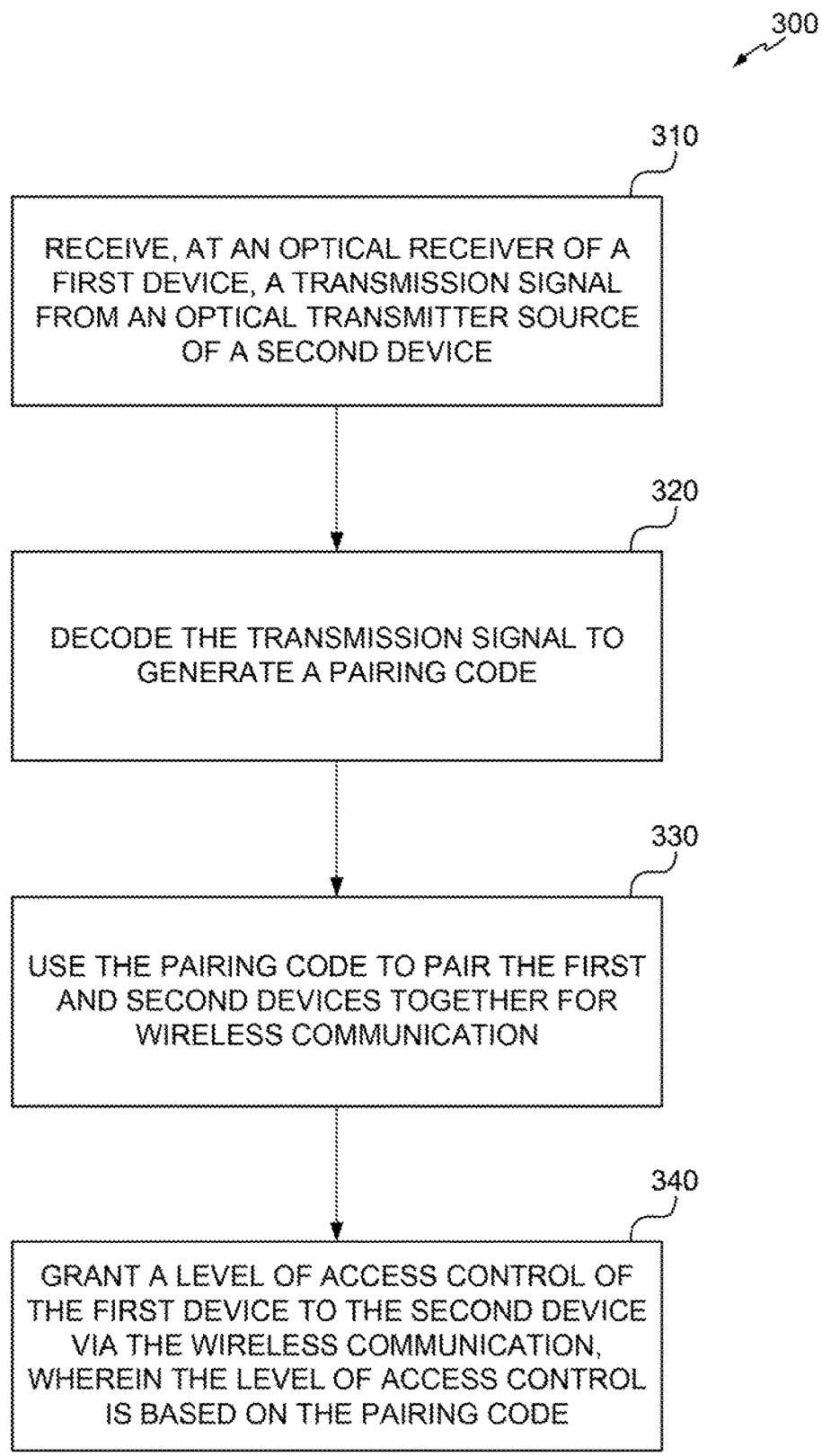
FIG. 3 is a flow diagram in accordance with an example of the present disclosure.

FIG. 3 is a flow diagram 300 of steps taken by a device to implement a method for pairing with another device for wireless communication, according to n example. In discussing FIG. 3, reference may be made to the first device 100 illustrated in FIG. 1. Such reference is made to provide contextual examples and not to limit the manner in which the method depicted by FIG. 3 may be implemented.

At 310, the device may receive, at an optical receiver of the device, a transmission signal from an optical transmitter source of another device, or a second device. As mentioned above, the emission of the transmission signal from the optical transmitter source may be triggered or initiated by a user of the second device. As an example, the user may prepare the device to receive a transmission signal, align the optical receiver of the first device With the optical transmitter source of the second device, in order to ensure that the transmission signal is received, and then initiate the transmission signal from the second device.

At 320, the device may decode the transmission signal to generate a pairing code. As an example, the pairing code may vary according to privileges granted to a user of the second device. The privileges granted may correspond to the level of access control the user has to the device via the second device. As an example, the pairing code may vary according to privileges granted to classifications of users (e.g., guest, standard, or administrator), and the user may be granted privileges based on the pairing code assigned to the classification that the user belongs to. As described above, the transmission signal received may vary based according to the privileges granted to the user, as the transmission signal is representative of the pairing code required for pairing the devices together.

At 330, the device may use the pairing code to pair the devices together for wireless communication. As an example, the pairing code may be used to pair the devices together for Bluetooth wireless communication. However, other forms of wireless communication may be used for pairing the devices together (e.g., connecting vie an ID broadcasted by one of the devices to join a common wireless network).

At 340, the device may grant a level of access control of the device to the second device via the wireless communication, wherein the level of access control is based on the pairing code, as described above. As an example, the device may log each attempt of the second device pairing with the device, in order to track users accessing the device via the second device (or other devices). Each log entry may be stored in a database of the device, and include the level of access control granted.

Although the flow diagram of FIG. 3 shows a specific order of execution, the order of execution may differ from that which is depicted. For example, the order of execution of two or more blocks or arrows may be scrambled relative to the order shown. Also, two or more blocks shown in succession may be executed concurrently or with partial concurrence. All such variations are within the scope of the present invention.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:
1. A method comprising:
    monitoring, by an optical receiver of a first device, for an initial connection protocol while the first device is in a standby mode;
    receiving, at the optical receiver of the first device:
        an initial connection protocol including a fixed set of light pulses from an optical transmitter source of a second device to align the first device with the second device while the first device is in the standby mode; and in response to receiving the initial connection protocol, a transmission signal including a sequence of light pulses having a variable brightness from the optical transmitter source of the second device when the second device is aligned with the first device;

exiting, by the first device, the standby mode in response to receiving the transmission signal;

decoding the transmission signal to generate a pairing code;

using the pairing code to pair the first and second devices together for wireless communication; and granting a level of access control of the first device to the second device via the wireless communication, wherein the level of access control is based on the pairing code.

2. The method of claim 1, wherein the pairing code varies according to privileges granted to a user of the second device, wherein the privileges granted correspond to the level of access control the user has to the first device via the second device.

3. The method of claim 1, wherein the pairing code varies according to privileges granted to classifications of users, wherein the privileges granted correspond to the level of access control a user from one of the classifications has to the first device via the second device.

4. The method of claim 1, wherein the transmission signal is unique for each user of the second device attempting to pair with the first device for wireless communication.

5. The method of claim 4, comprising:
logging each attempt of the second device pairing with the first device, to track users accessing the first device via the second device, wherein each log entry comprises the level of access control granted.

6. The method of claim 1, wherein the pairing code is used to pair the first and second devices together for Bluetooth wireless communication.

7. The method of claim 1, wherein transmission signals received from the optical transmitter source of the second device are different for subsequent pairings between the first and second devices, and wherein the different transmission signals are decoded to generate different pairing codes for each subsequent pairing.

8. A first device comprising:
an optical receiver;
a transceiver;
a database; and
a processor to:
monitor, by the optical receiver, for an initial connection protocol while the first device is in a standby mode;
receive, at the optical receiver:
the initial connection protocol including a fixed set of light pulses from an optical transmitter source of a second device to align the first device with the second device while the first device is in the standby mode; and
in response to receiving the initial connection protocol, a transmission signal including a sequence of light pulses having color variations from the optical transmitter source of the second device when the second device is aligned with the first device;
exit the standby mode in response to receiving the transmission signal;
decode the transmission signal to generate a pairing code;
use the transceiver to use the pairing code to pair the first and second devices together for wireless communication;
grant a level of access control of the first device to the second device via the wireless communication, wherein the level of access control is based on the pairing code; and
log attempts of the second device pairing with the first device into the database.

9. The first device of claim 8, wherein the pairing code varies according to privileges granted to a user of the second device, wherein the privileges granted correspond to the level of access control the user has to the first device via the second device.

10. The first device of claim 8, wherein the pairing code varies according to privileges granted to classifications of users, wherein the privileges granted correspond to the level of access control a user from one of the classifications has to the first device via the second device.

11. The first device of claim 8, wherein the transmission signal is unique for each user of the second device attempting to pair with the first device for wireless communication.

12. A non-transitory computer-readable storage medium comprising program instructions which, when executed by a processor, to cause the processor to:
monitor, by an optical receiver of a first device, for an initial connection protocol while the first device is in a standby mode;
receive, at the optical receiver of the first device:
an initial connection protocol including a fixed set of light pulses from an optical transmitter source of a second device to align the first device with the second device while the first device is in the standby mode; and
in response to receiving the initial connection protocol, a transmission signal including a sequence of light pulses including a variable brightness and color variations from the optical transmitter source of the second device when the second device is aligned with the first device;
exit, by the first device, the standby mode in response to receiving the transmission signal;
decode the transmission signal to generate a pairing code, wherein the pairing code varies according to privileges granted to a user of the second device, wherein the privileges granted correspond to a level of access control the user has to the first device via the second device;
use the pairing code to pair the first and second devices together for wireless communication; and
grant the level of access control of the first device to the second device via the wireless communication, wherein the level of access control is based on the pairing code.

13. The non-transitory computer-readable storage medium of claim 12, wherein the pairing code varies according to privileges granted to classifications of users, wherein the privileges granted correspond to the level of access control a user from one of the classifications has to the first device via the second device.

14. The non-transitory computer-readable storage medium of claim 12, wherein the transmission signal is unique for each user of the second device attempting to pair with the first device for wireless communication.

* * * * *